J. Hageman,
Bucket and Measure.
Nº 36,613.        Patented Oct. 7, 1862.
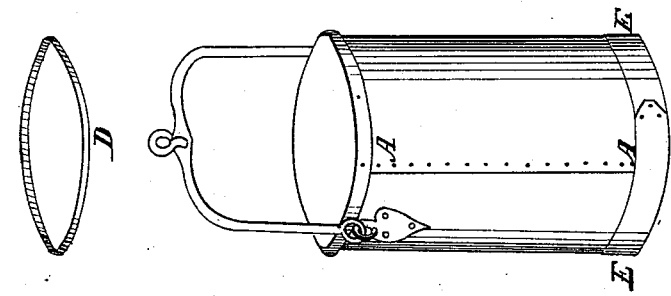
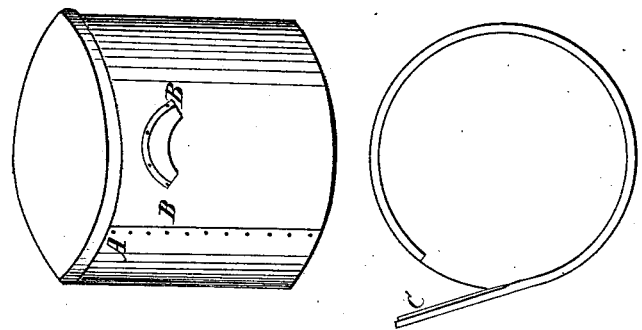
Witnesses                Inventor:

UNITED STATES PATENT OFFICE.

JAMES HAGEMAN, OF WILLIAMSBURG, OHIO.

IMPROVEMENT IN BUCKETS AND MEASURES.

Specification forming part of Letters Patent No. 36,613, dated October 7, 1862.

*To all whom it may concern:*

Be it known that I, JAMES HAGEMAN, of the town of Williamsburg, in the county of Clermont and State of Ohio, have invented a new and Improved Mode of Manufacturing and Putting up Dry-Measures and Well-Buckets; and I do hereby declare that the following is a full and exact description thereof, reference being had to the accompanying drawings, and to the letters of reference marked thereon.

The nature of my invention consists in applying iron and dispensing with wood altogether in putting up or manufacturing dry-measures or well-buckets, except when a vessel is wanted so that the bottom cannot be sprung, or for other reasons. I then use wooden bottoms bound with iron before set in the vessel, as herein described.

To enable others skilled in the art to make and use my invention, I will proceed to describe its construction.

I select a sheet of iron of the desired thickness, and after making it the proper size I bend it in the form of the vessel intended. I then fasten the ends together firmly by means of rivets, as shown in the accompanying drawings, letters A A, Figures 1 and 4, which form the bodies of the vessel. I stiffen the top by means of stout iron or hoop by shrinking it on the vessel and fastening it by riveting it fast, or by making sinks in the inside of the rim before putting it on. I then countersink the iron of the body of the vessel into the sinks previously made in the rim. I form the ears or hand-holds to the dry-measures by binding a suitable piece of iron in the proper shape and fastening it on by means of rivets, as shown in the draft Fig. 1, letters B B.

When wooden bottoms are desired, I prepare them by cutting them the proper size out of a plank the desired thickness. I then bind the edge with iron, as represented in the draft Fig. 2.

Letter C represents part of the flange or binding not yet closed up to the wood. When prepared, I set it in its proper place and fasten it firmly with nails or screws from the outside through into the wood.

When iron bottoms are desired, I prepare them by cutting iron the proper size and form, and turn the edge over as I would if I were making a lid, as shown in the draft Fig. 3, letters D D. When prepared, I set it in with the flange downward and fasten with rivets.

When a hold for the fingers is wanted at the bottom of a vessel with the wooden bottom, I set the bottom up sufficient for that purpose, and put on a hoop to stiffen the bottom of the vessel, as shown in the draft Fig. 4, letters E E.

I use the bail and ears on the well-bucket the same as is used on other well-buckets.

I do not claim constructing buckets and measures of metal or of metal and wood combined; but What I do claim, and desire to secure by Letters Patent, is—

The wooden bottom when bound around the edge with metal and attached to the body of the bucket or measure, in the manner and for the purposes set forth.

JAMES HAGEMAN.

Witnesses:
G. W. FELTER,
L. B. FELTER.